United States Patent [19]

Kiuchi

[11] Patent Number: 5,184,049

[45] Date of Patent: Feb. 2, 1993

[54] MOTOR BRAKE CONTROL CIRCUIT FOR REDUCING MOTOR STOPPING TIME

[75] Inventor: Hiroyuki Kiuchi, Komagane, Japan

[73] Assignee: Sankyo Seiki Mfg. Co., Ltd., Nagano, Japan

[21] Appl. No.: 711,301

[22] Filed: Jun. 6, 1991

[30] Foreign Application Priority Data

Jun. 22, 1990 [JP] Japan .................................. 2-164537

[51] Int. Cl.⁵ .............................................. H02P 3/00
[52] U.S. Cl. ...................................... 318/362; 318/87
[58] Field of Search ................. 318/254, 138, 87, 362, 318/363, 374, 375, 379, 528, 256, 261, 264, 269, 272, 275, 293, 370, 373, 469

[56] References Cited

U.S. PATENT DOCUMENTS

| | | | |
|---|---|---|---|
| 4,072,879 | 2/1978 | Wadleigh | 318/87 X |
| 4,085,354 | 4/1978 | Harshberger, Jr. | 318/87 |
| 4,354,147 | 10/1982 | Klaussner | 318/375 X |
| 4,494,058 | 1/1985 | Berti | 318/372 |
| 4,622,499 | 11/1986 | Squires et al. | 318/254 |
| 4,922,169 | 5/1990 | Freeman | 318/254 |
| 5,010,283 | 4/1991 | Katajima et al. | 318/374 X |

Primary Examiner—A. Jonathan Wysocki
Attorney, Agent, or Firm—McAulay Fisher Nissen Goldberg & Kiel

[57] ABSTRACT

A motor brake control circuit is provided with a coil short circuit for short-circuiting the power terminals of the coil once a brake signal is issued from its brake circuit so that the brake is forcibly and continuously applied to the motor. With such an arrangement, the time required for the motor to come to a complete stop after the issuance of a brake command signal is considerably reduced as compared with a motor that does not have such a coil short circuit and, therefore, comes to a complete halt only by natural deceleration. Further, since the motor is braked by the short-circuited motor coil when the brake control circuit is activated, there is virtually no affect on the motor by external force such as vibration to shift its rotary position in a braked condition.

10 Claims, 5 Drawing Sheets

MOTOR BRAKE CONTROL CIRCUIT FOR REDUCING MOTOR STOPPING TIME

BACKGROUND OF THE INVENTION a) Field of the Invention

The present invention relates to a motor brake control circuit for reducing the time required for a motor to come to a complete stop from the initiation of braking operation.

b) Prior Art

The rotary speed of the disc-carrying turn table in a compact disc or laser disc playing apparatus needs to be reduced to as low as 30 r.p.m., for instance, or to zero r.p.m. whenever the disc is to be replaced in order to avoid any possible damage to the disc. It is desirable for a person who uses the apparatus that the time required for replacing the disc be as short as possible. A brake circuit is normally provided for a disc playing apparatus to brake the spindle motor of the apparatus with a view to meeting these requirements.

In U.S. Pat. No. 5,010,283, a motor brake control circuit is disclosed comprising a first discriminator circuit for detecting the sense of rotation of the motor by applying a rotatory signal having a value proportional to the rate of rotation of the motor, a second discriminator circuit for detecting the sense of rotation of the motor by applying a negative logic signal of the rotational signal, a sense-of rotation directing circuit for controlling the motor drive circuit and reversing the sense of rotation of the motor whenever a brake command is given to the motor and a brake circuit for turning off the power for said drive circuit whenever a change in the signals from the first and second discriminator circuits is detected for the first time after the reversal of the sense of rotation of the motor.

With a motor brake control circuit according to the above patent, the sense of rotation of the motor is detected by the first discriminator circuit from a rotational signal having a value proportional to the rate of rotation of the motor and concurrently by the second discriminator circuit from a negative logic signal of the rotational signal. The motor drive circuit is controlled by the sense-of-rotation directing circuit for reversing the sense of rotation of the motor whenever a brake command is given to the motor. The power for the motor drive circuit is turned off whenever a change in the signals from the first and second discriminator circuits is detected for the first time after the reversal of the sense of rotation of the motor. With such an arrangement, the motor is subjected to a braking force which is proportional to the force of inertia of the load applied to the motor and the power for the motor is turned off only after a period of a half cycle of the rotational signal has elapsed subsequent to the reversal of the sense of rotation of the motor caused by the brake. The net effect of such an arrangement is, therefore, a reduced time required for stopping a motor after applying the brake regardless of the level of the load being applied to the motor.

While the above arrangement has advantages as described above, additional improvements can be made. Since the brake is applied once to the motor only after a reversal in the sense of rotation of the motor is detected and then the motor is left for natural deceleration, the motor can keep rotating considerably by the force of inertia after the application of the brake.

FIGS. 5 and 6 of the accompanying drawings show the relationship between the stopping action and the time required for it of a motor comprising a motor brake control circuit according to the cited invention, where a 3.5 inch optical/magnetic disc constitutes the load applied to the motor. As can be seen from FIGS. 5 and 6, if a brake command is issued while the motor is running in a predetermined direction, the motor is braked by a force trying to drive it in the opposite direction and, as soon as the motor is detected to be actually running in the opposite direction, the power for the motor is turned off. Therefore, at the final stages of the braking operation, the motor keeps on rotating by the force of inertia of the motor itself and the load applied to it, prolonging the time required for the motor to actually come to a complete standstill.

It is therefore an object of the present invention to solve the above described technological problem by providing a motor brake control circuit that forcibly and electrically applies the braking action to the motor without leaving it to natural deceleration so that the time required for the motor to come to a complete standstill from the initiation of braking operation may be significantly reduced.

SUMMARY OF THE INVENTION

According to the present invention, the above object is achieved by providing a motor brake control circuit comprising a first discriminator circuit for detecting the sense of rotation of the motor by applying a rotational signal having a value proportional to the rate of rotation of the motor, a second discriminator circuit for detecting the sense of rotation of the motor by applying an inverted signal of the rotational signal, a sense-of-rotation directing circuit for controlling the motor drive circuit and reversing the sense of rotation of the motor whenever a brake command is given to the motor, a brake circuit for turning off the power being supplied to the motor coil whenever a change in the signals from the first and second discriminator circuits is detected for the first time after the reversal of the sense of rotation of the motor and coil short circuit means for short-circuiting the power terminals of the motor coil the instant the brake signal is issued from the brake circuit.

With such an arrangement, the sense of rotation of the motor is detected by the first discriminator circuit from a rotational signal having a value proportional to the rate of rotation of the motor and concurrently by the second discriminator circuit from a negative logic signal formed from the rotational signal and the motor drive circuit is controlled by the sense-of-rotation directing circuit so as to reverse the sense of rotation of the motor whenever a brake command is given to the motor, while the power for the motor coil is turned off whenever a change in the signals from the first and second discriminator circuits is detected for the first time after the reversal of the sense of rotation of the motor and the coil short circuit short-circuits the power terminals of the motor coil to bring the motor to a complete standstill the instant the brake signal issues.

For a better understanding of the present invention, reference is made to the following description and accompanying drawings while the scope of the invention will be pointed out in the appended claims.

DETAILED DESCRIPTION OF THE INVENTION

Figure 1:
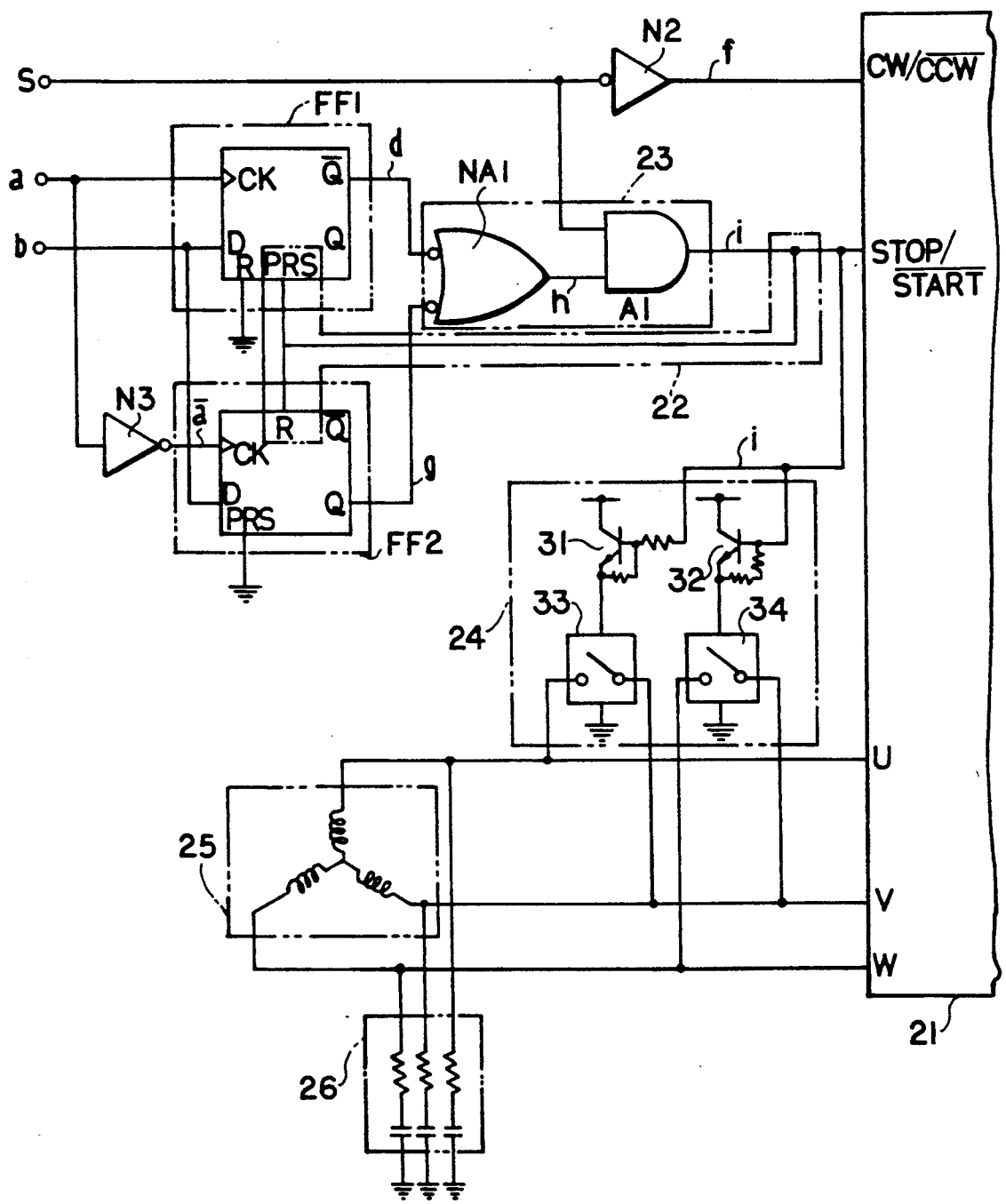
FIG. 1 is a circuit diagram of a preferred embodiment of the motor brake control circuit of the present invention.

Referring to FIG. 1, reference symbols a and b denote rotational signals. Such rotational signals may be provided by a rotation detector comprising Hall elements, Hall ICs and magnetoresistive elements and are clock-pulse type signals obtained by shaping the waveform of the output signals of the rotation detector and having values proportional to the rate of rotation of the motor and phases differentiated from each other. Reference symbol S denotes a brake command signal.

D flip-flop FF1, which constitutes the first discriminator circuit, determines the sense of rotation of the motor by latching the rotational signal b at the rising edge of the rotational signal a. The rotational signal a is inverted by an inverter N3 and D flip-flop FF2, which constitutes the second discriminator circuit, determines the sense of rotation of the motor by latching the rotational signal b at the rising edge of the inverter signal a or upon receiving a negative logic signal of the rotational signal a.

The brake command signal S is inverted by an inverter N2 that constitutes a sense-of-rotation command circuit to produce a sense-of-rotation command f (sense-of-rotation signal CW/$\overline{\text{CCW}}$), which is applied to motor drive circuit 21. The brak ecommand signal S is applied to one of the input terminals of AND-gate A1.

Brake circuit 23 comprises an AND-gate A1 and a NAND-gate NA1. The NAND-gate NA1 receives the inverted output signal d of the D flip-flop FF1 and the output signal g of the D flip-flop FF, whereas the other terminal of the AND-gate A1 receives the output signal of the NAND-gate NA1. The output signal of the AND-gate A1 is applied to the drive circuit 21 as a conducting signal i (STOP/$\overline{\text{START}}$).

The conducting signal i or the output signal of the AND-gate A1 is applied to the set-circuit of the D flip-flop FF1 and the reset-circuit of the D flip-flop FF2. Brake holding circuit 22 directs the conducting signal i to the set circuit of the D flip-flop FF1 and the reset-circuit of the D flip-flop FF2.

The drive circuit 21 controls the phases of a three-phase motor coil 25, phase Y, phase V and phase W, according to the sense-of-rotation command signal f and the conducting signal i in such a manner that the motor may be rotated normally or reversely or braked to stop in accordance with the signals.

The drive circuit 21 functions to drive the motor in the normal direction when the brake command signal S is off (or set to LOW level) and the sense-of-rotation command signal f from the inverter N2 is high and in the reverse direction when the brake signal is off (or set to HIGH level) and the sense-of-rotation command signal f is low. The motor may rotate either clockwise (CW) or counterclockwise (CCW) for normal rotation and the logic for the motor is so designed that the motor runs in a reverse direction only when the brake command signal becomes on. Further, the drive circuit 21 is so designed that the motor is powered to rotate in the normal sense of rotation when the brake command signal S is off and the conducting signal i from the AND-gate 23 is low.

Figure 7:
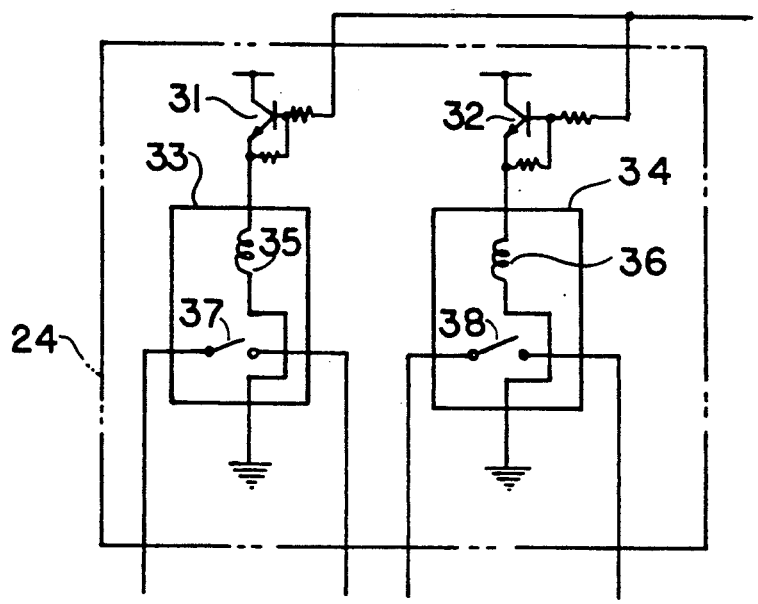
FIG. 7 illustrates a schematic representation for the power switches of the present invention employing relays.
Figure 8:
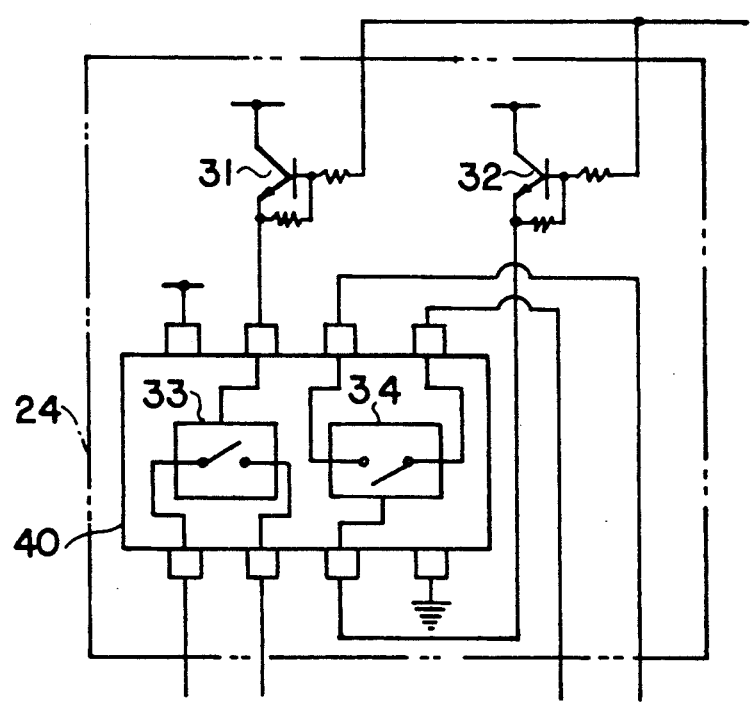
FIG. 8 illustrates a schematic representation for the power switches of the present invention employing semiconductor.

The conducting signal i turns out to be a brake signal whenever it becomes high. Then, the signal i is applied to coil short circuit 24. The coil short circuit 24 comprises two transistors 31 and 32 which are turned on when the conducting signal i is presented as a high level brake signal and two switches 33 and 34 which are turned on respectively as the transistors 21 and 32 are turned on. The switch 33 is connected to the U-phase and V-phase of the motor coil 25, whereas the switch 34 is connected to the V-phase and W-phase of the motor coil 25. The switches 33 and 34 may be of any type so long as they are respectively turned on as the transistors 31 and 32 are turned on and are typically relay or semiconductor switching devices. FIG. 7 schematically shows power siwtches 33 and 34 in the form of relays while FIG. 8 schematically shows power switches 33 and 34 in the form of semiconductors forming part of an integrated circuit. In FIG. 7, the relay coils are 35 and 36 while the relay arms are identified as 37 and 38. In FIG. 8, the integrated circuit transistorized circuit is identified as 40. Three noise quieting circuits 26, each comprising a resistor and a capacitor, are respectively connected to the three phases of the motor coil 25.

The operation of the embodiment having a configuration as described above will be described with reference to FIGS. 2 through 4.

Firstly, assume that the motor currently rotates in the normal sense of rotation. In this condition, the brake command signal S is off and the conducting signal i of the AND-gate A1 of the brake circuit 23 is low so that the motor is driven by the drive circuit 21. At the same time, the brake command signal S is inverted by the inverter N2 that constitutes the sense-of-rotation command circuit to produce a sense of rotation command signal f, which is at HIGH level and is applied to the motor to rotate it in the normal sense of rotation.

In this condition, where the motor is rotated in the normal sense of rotation, the waveform of the detection signal of the given rotation deteotor is shaped to generate rotational signals a and b in the form of clock pulses having phases different from each other. The D flip-flop FF1 that constitutes the first discriminator circuit determines the sense of rotation or the motor by latching the rotational signal b at the rising edge of the rotational signal a. The d flip-flop FF2 that constitutes the second discriminator circuit determines the sense of rotation of the motor by latching the rotational signal b at the rising edge of the signal a obtained by inverting the rotational signal a. Here, both the inverted output d of the D flip-flop FF1 and the inverted output g of the D flip-flop FF2 are at HIGH level.

Figure 2:
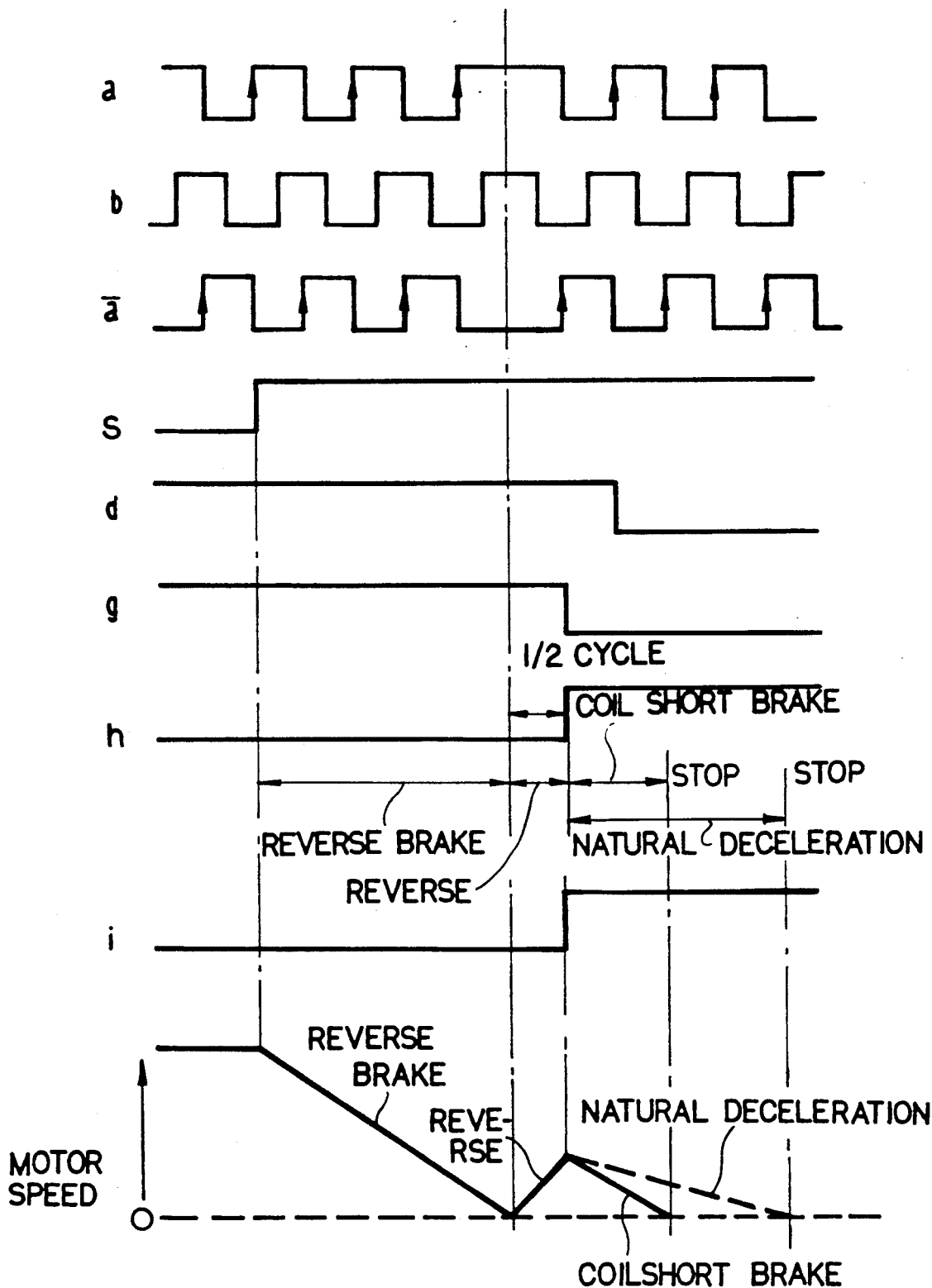
FIG. 2 is a set of timing charts illustrating the operation of the embodiment of FIG. 1.

Now, if the brake command signal S becomes on in the above described condition where the motor is running in the normal sense of rotation, the sense of rotation command signal f from inverter N2 becomes low so that the drive circuit 21 drives the motor to rotate in the opposite sense. Then, as illustrated in FIG. 2, the brake is applied to the motor to reduce the rotary speed of the motor, eventually bringing it to a complete standstill and then driving it to rotate in the opposite direction.

As the motor starts to rotate reversely, the D flip-flop FF1 detects the reverse rotation to bring the output signal d to LOW level. Similarly, the D flip-flop FF2 also detects the reverse movement to bring the output signal d to LOW level. The time required for the D flip-flop FF1 and the D flip-flop FF2 to detect the reverse movement following the actual start of reverse movement of the motor is the period of a cycle of the rotational signal at the maximum. However, since the output of the NAND-gate NA1 of the brake circuit 23 becomes high as soon as either one of said output signals f and g becomes low to turn the conducting signal i which is the output of the AND-gate A1 of the brake circuit 23 into a high level brake signal, or, differently stated, the change in the output signals f and g detected for the first time after the reversal of the movement of the motor causes the signal to turn into a brake signal, the time required to detect the reverse movement of the motor since the actual start of reverse movement will be reduced to less than the period of a half cycle of the rotational signals a and b.

As soon as the brake signal is issued, the power for the motor coil 25 is turned off. The brake signal is also applied to the coil short circuit 24 to turn on the transistors 31 and 32 of the coil short circuit 24 to short-circuit the U-V phases and V-W phases of the motor coil 25 and to intentionally brake the motor.

Figure 3:
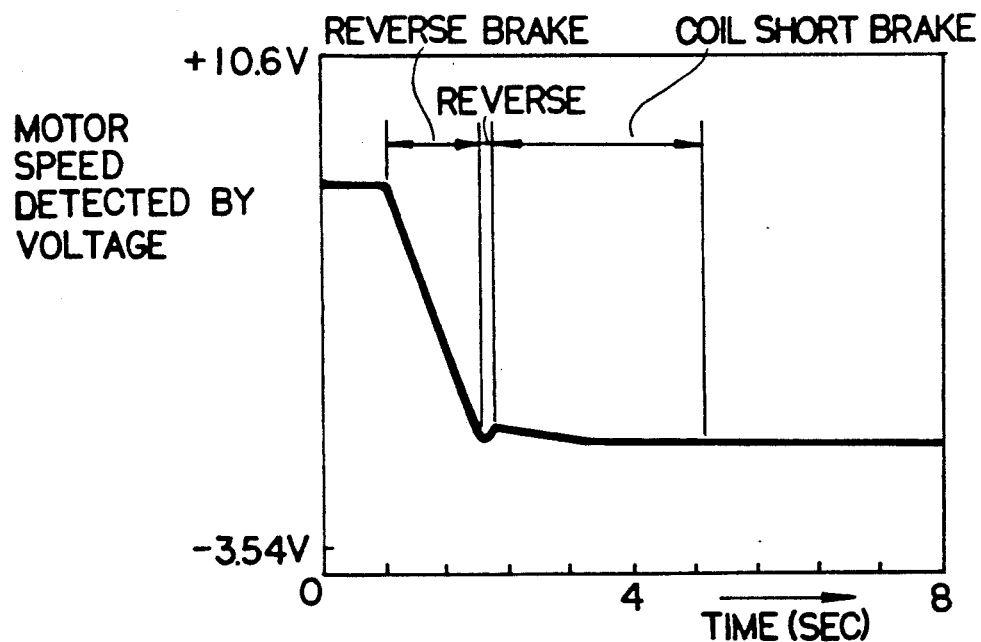
FIG. 3 is a graph showing the action of the embodiment during its operation.
Figure 4:
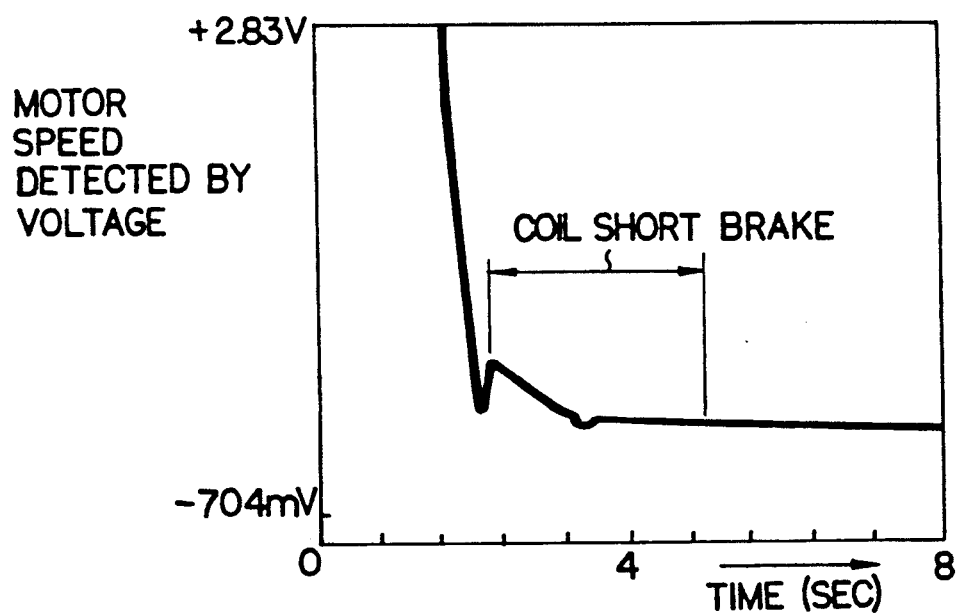
FIG. 4 is a graph showing a part of the action of the embodiment of FIG. 3 in greater detail.
Figure 5:
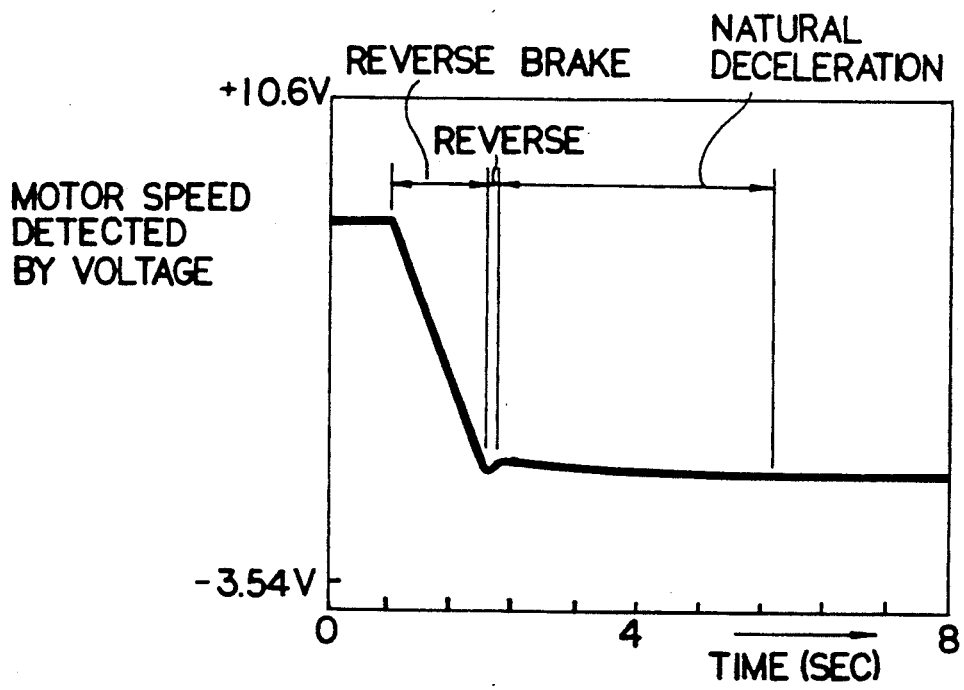
FIG. 5 is a graph which is similar to FIG. 3 showing the action of a prior embodiment.
Figure 6:
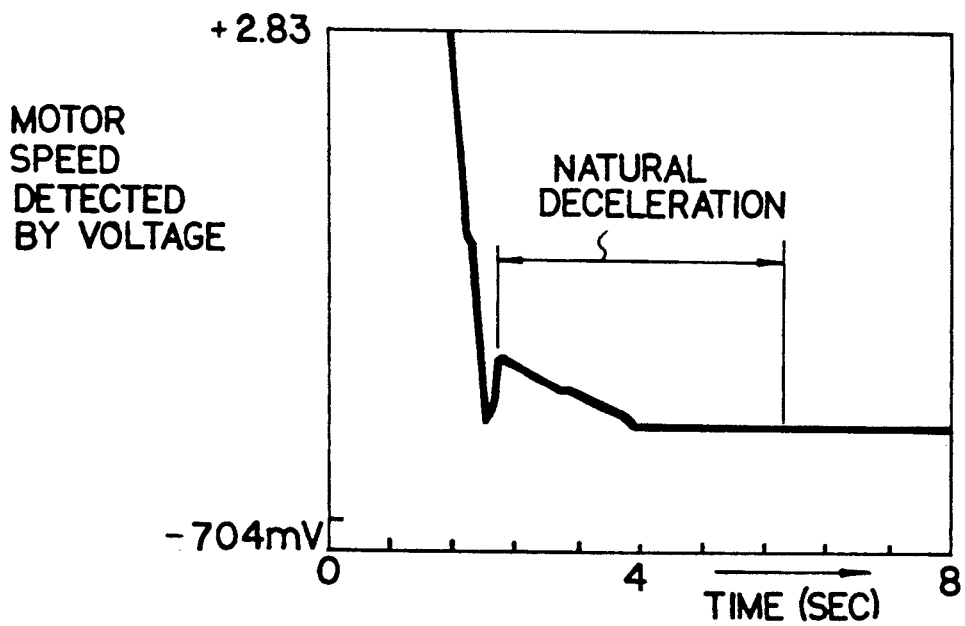
FIG. 6 is a graph similar to FIG. 4 showing a portion of the action of the embodiment of FIG. 5 in greater

The device for short-circuiting the phases of the motor coil differentiates the present invention from the referenced patent. FIGS. 3 and 4 illustrate the performance of a motor provided with a brake control circuit comprising a short-circuiting device at the time of stopping its motion, whereas FIGS. 5 and 6 show the corresponding performance of a motor for a load of a 3.5 inch optical magnetic disc provided with a brake control circuit according to the prior art and therefore devoid of such a short-circuiting device. As may be clearly seen by comparing FIGS. 3 and 4 and FIGS. 5 and 6 and as indicated by the solid line and the broken line in charts H and I in FIG. 2, the time required for a motor provided with a short-circuiting device to come to a complete stop subsequent to the application of a brake command signal is approximately seven-tenths of the time for a motor without such short-circuiting device. This represents a considerable reduction of time required for deceleration and actual stopping.

Since the motor coil 25 is short-circuited by the coil short circuit 24, a motor provided with a brake control circuit according to the present invention is accompanied by an additional advantage of enhanced resistance of the motor to external force such as vibrations which normally have a tendency to move the rotor of the motor.

The brake signal issued by the brake circuit 23 is applied to the set-terminal of the D flip-flop FF1 and the reset-terminal of the D flip-flop FF2 by way of the brake holding circuit 22 to set the D flip-flop FF1 and reset the D flip-flop FF2. Thus, the output signal i of the brake circuit 23 is held as a high level brake signal that maintains the drive circuit 21 in a braked condition.

When the power source to the motor is turned on, the motor remains in its stopped condition because the switch is turned to the brake side and the brake command signal S is on.

While the motor coil 25 is short-circuited between the U and V phases and the V and W phases by the coil short circuit 24 in the illustrated embodiment, it may be so arranged that it is also short-circuited between the W and U phases. The number of phases of the motor coil may not necessarily be three but any appropriate number of phases may be adopted for the motor coil.

While the sense of rotation of the motor of the above described embodiment is detected by means of two-phased rotational signals a and b, three-phased rotational signals may be alternatively used so that two or three sets of first and second discriminator circuits may be arranged for the motor in such a manner that each circuit determines the sense of rotation of the motor by means of any combined two of the three-phased rotational signals and the change in the signals from the two or three sets of discriminator circuits detected for the first time after the reversal of motion of the motor may be detected by the brake circuit. With such an arrangement, while a signal representing the detection is used to turn off the power for the motor coil and activate the coil short circuit to short-circuit the terminals of the motor coil in the case of the illustrated embodiment, the time required for the circuit to detect the reversed motion of the motor and cause the motor to come to a complete standstill subsequent to the activation of the brake system will be further reduced.

As is apparent from the above description, since a motor brake control circuit according to the invention comprises a brake circuit that applies the brake to the motor by turning off the power being supplied to the motor upon detecting the first change in the signals from the first and second discriminator circuits after a reversal of the sense of rotation of the motor and additionally a coil short circuit for shortcircuiting the power terminals of the coil once a brake signal is issued from the brake circuit, the brake is forcibly and continuously applied to the motor after the detection of the reversal of the sense of rotation of the motor. With such an arrangement, the time required for the motor to come to a complete stop after the issuance of a brake command signal is considerably reduced as compared with a motor that does not have such a coil short circuit and, therefore, comes to a complete halt only by natural deceleration after detection of a reversal of the sense of rotation of the motor.

Further, since the motor is braked by the shortcircuited motor coil when the brake control circuit is activated, it is scarcely affected by external force such as vibration which otherwise would shift its rotary position in a stopped condition.

While the foregoing description and drawings represent the preferred embodiments of the present invention, it will be obvious to those skilled in the art that various changes and modifications may be made therein without departing from the true spirit and scope of the present invention.

What is claimed is:

1. A motor brake control circuit comprising:
   a first discriminator circuit for detecting the sense of rotation of the motor by applying a rotational signal having a value proportional to the rate of rotation of the motor; a second discriminator circuit for detecting the sense of rotation of the motor by applying an inverted signal of said rotational signal;

a sense-of-rotation directing circuit for controlling the motor drive circuit and reversing the sense of rotation of the motor whenever a brake command is given to the motor;

a brake circuit for turning off the power being supplied to the motor coil whenever a change in the signals from the first and second discriminator circuits is detected for the first time after the reversal of the sense of rotation of the motor; and coil short circuit means for short-circuiting power terminals of the motor coil the instant the brake signal is issued from the brake circuit.

2. The motor brake circuit as in claim 1 wherein said motor is a three phase motor and said coil short circuit means functions to apply a short circuit to two of the three 3. The motor brake circuit of claim 2 wherein said coil short circuit means functions to apply a short circuit to all three phases of the motor.

4. The motor brake circuit of claim 1 wherein said motor is a polyphase motor and said short circuit means functions to apply a short circuit to a number of phases of the 5. The motor brake circuit of claim 1 including a third discriminator circuit developing a further rotational signal, said first, second and third discriminator determining the sense of rotation of the motor by a combination of two of the rotational signal, the inverted signal and the further rotational signal; a change in signal from at least two of the discriminator circuits being detected for the first time after reversal of motion of the motor.

6. The motor brake control circuit of claim wherein said inverted signal is an inverted logic signal.

7. The motor brake circuit of claim 1 wherein said coil short circuit means includes a pair of semiconductor switching elements and a pair of power switches responsive to said switching elements.

8. The motor brake circuit of claim 7 wherein said pair of power switches includes a pair of relays.

9. The motor brake circuit of claim 7 wherein said pair of power switches includes a pair of semiconductors.

10. The motor brake circuit of claim 2 including noise suppressing circuits being applied to each phase of the motor.

* * * * *